(No Model.) 2 Sheets—Sheet 1.
J. R. SNYDER & J. DEETS.
REVERSE LINK FOR STEAM ENGINES.
No. 400,960. Patented Apr. 9, 1889.
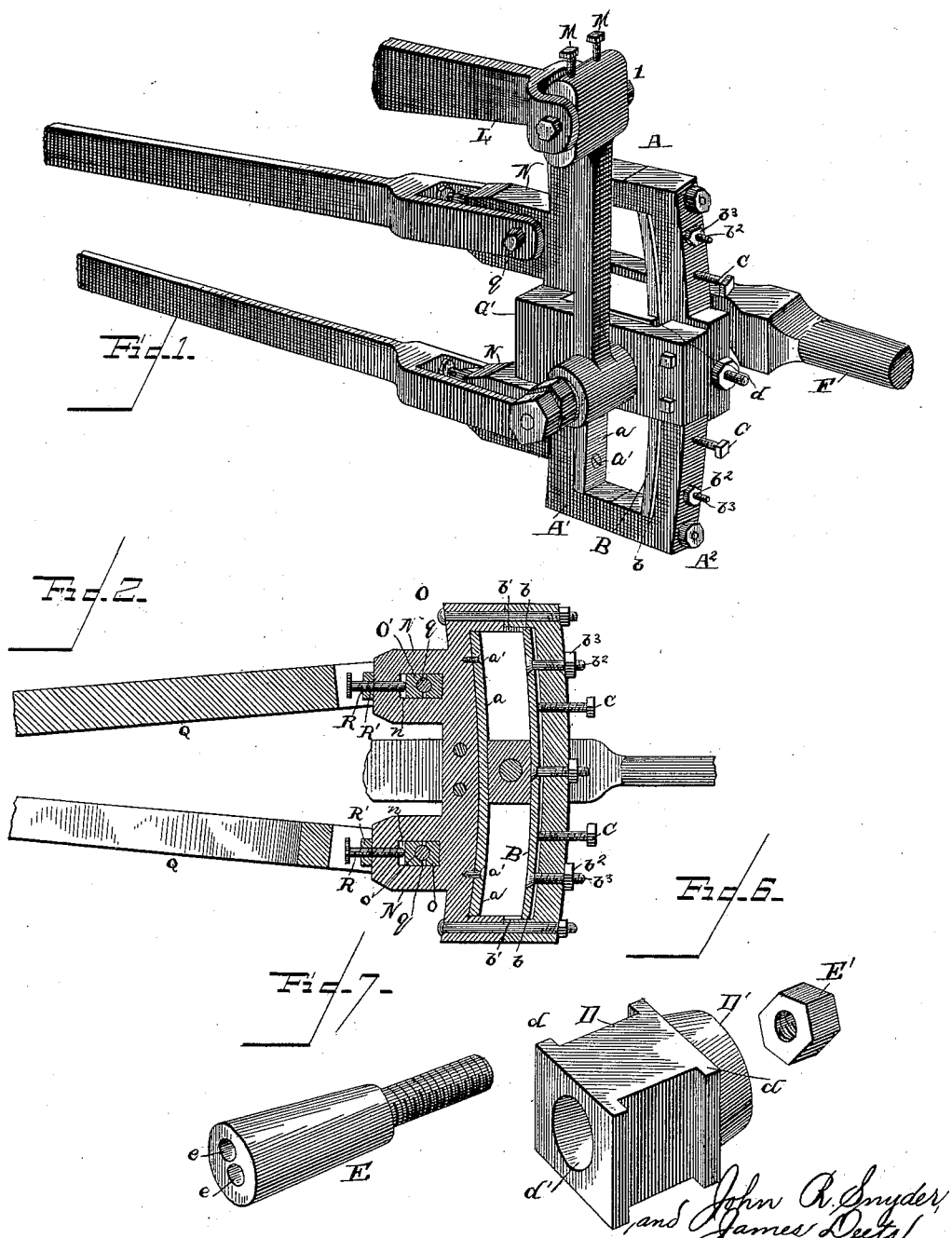
WITNESSES,
INVENTORS.
John R. Snyder
and James Deets
by J. R. Littell, Attorney.

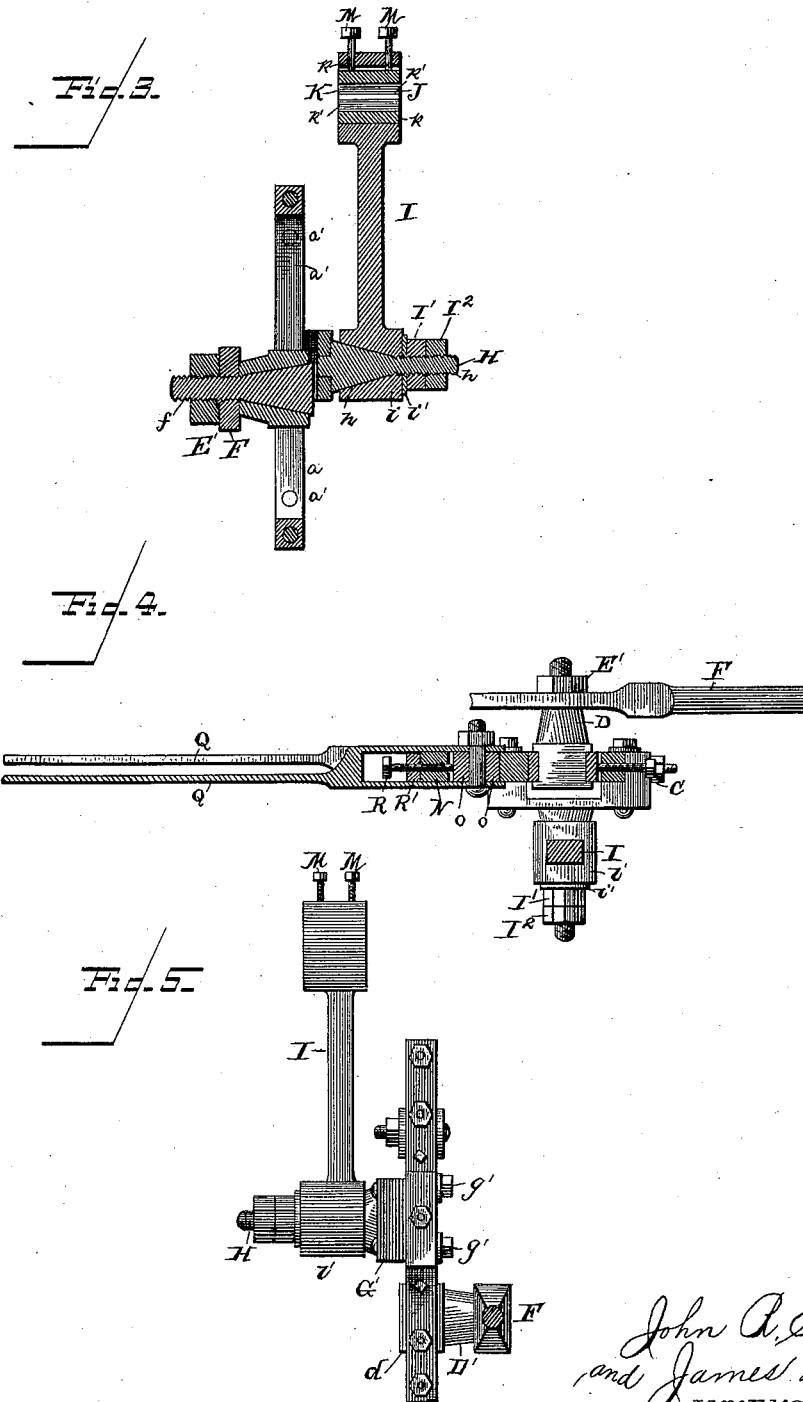

UNITED STATES PATENT OFFICE.

JOHN R. SNYDER AND JAMES DEETS, OF AGENCY, MISSOURI.

REVERSE-LINK FOR STEAM-ENGINES.

SPECIFICATION forming part of Letters Patent No. 400,960, dated April 9, 1889.

Application filed November 3, 1888. Serial No. 289,922. (No model.)

*To all whom it may concern:*

Be it known that we, JOHN R. SNYDER and JAMES DEETS, citizens of the United States, residing at Agency, in the county of Buchanan and State of Missouri, have invented certain new and useful Improvements in Reverse-Links for Steam-Engines; and we do hereby declare that the following is a full, clear, and exact description of the invention, which will enable others skilled in the art to which it appertains to make and use the same.

This invention relates to reverse-links for steam-engines, and its object is to provide a simple and improved device of this character wherein all the parts and connections are adjustable to take up wear.

A further object of the invention is to provide a reverse-link possessing advantages in point of inexpensiveness, durability, and general efficiency.

In the drawings, Figure 1 is a perspective view of a reverse-link and connections embodying our invention. Fig. 2 is a longitudinal sectional view. Fig. 3 is a similar view at right angles thereto. Fig. 4 is a transverse sectional view. Fig. 5 is an end elevation. Figs. 6 and 7 are detail perspective views of the link-block and pin therefor, respectively.

Corresponding parts in the figures are denoted by the same letters of reference.

Referring to the drawings, A designates the link, which is similar in general construction to the ordinary link, and is composed of two sections, A' A$^2$, bolted together at their ends. To the inner face of the section A' is secured a facing, $a$, by screws $a'$, the heads of which are embedded in the facing, so as to present a smooth surface. This facing is preferably formed of steel, and its securing-screws are adapted to be loosened for the insertion of a wedge or other strip of metal—such as copper—under the facing, to take up a part of the wear from this side of the link.

At the opposite face of the link is provided an adjustable facing, B. This facing is also preferably formed of steel, and has contracted ends $b\ b$, which fit in grooves $b'\ b'$ in the inwardly-projecting ends $a^2\ a^2$ of the section A$^2$. For adjusting the facing B a bolt, $b^2$, is provided at each end and the center thereof, which pass through it and the section A$^2$ of the link. The heads of the bolts are embedded in the facing after the manner of the screws in the facing $a$, and a nut, $b^3$, is disposed upon the outer end of each bolt. Through the section A$^2$ of the link and between the bolts $b^2$ are provided adjusting-screws C C, the inner ends of which bear against the rear side of the facing. When it is desired to adjust the facing B inwardly, the nuts upon the bolts $b^2$ are loosened and the screws C are tightened against the facing. Thus the latter is not only adjusted, but by reason of the novel arrangement of the bolts and screws it is also held rigid when in adjusted position.

D designates the link-block, which is provided with the ordinary grooved sides, $d\ d$, for the reception of the facings $a$ and B, forming the guides therefor. From one of the outer sides of the link-block projects a conical extension, D', and through said block and extension is formed a conical bearing, $d'$, tapering toward the latter. Within the bearing $d'$ is disposed a corresponding pin, E, which is reduced at the smaller end of the bearing portion, said reduced end being screw-threaded. The latter is received by a screw-threaded perforation, $f$, in the end of the valve-rod F. The outer or larger end of the bearing portion of the pin is provided with recesses $e\ e$, adapted to be engaged by a key for screwing the pin into the valve-rod. It will be obvious that the bearing portion of the pin is not entirely located within the bearing of the link-block, leaving a projecting portion at its larger end to be adjusted to take up the wear of the pin and bearing. A nut, E', is screwed upon the threaded end of the pin and against the valve-rod to prevent the latter from turning.

Upon the opposite side of the link to that upon which the valve-rod is located and at its center is secured the link-saddle G' by means of bolts $g$, or in any other suitable manner. From the link-saddle projects a rigid journal-pin, H, similar to the link-block pin E, and consisting of an inner conical bearing portion, $h$, tapering outwardly, from which projects a reduced screw-threaded extension, $h'$. I designates a hanger, provided at its lower end with a conical bearing, $i$, corresponding to and received by the bearing portion of the pin H. A washer, $i'$, is placed upon the extension of the pin against the hanger and an adjusting-nut, $I'$, screwed against the washer. To lock the nut $I'$, a second nut, $I^2$, is provided, which binds against the same.

The upper end of the hanger is provided with a transverse vertically-elongated recess, J, within which is disposed a sectional bearing-block, K, for the reception of the pivot-pin $l$, connecting the hanger with the lever-crank L. The bearing-block fits closely between the sides of the recess, but is of less length than the latter, and consequently has longitudinal play therein. This block comprises two corresponding sections, $k$ $k$, the opposing faces being provided with oppositely-disposed approximately-semicircular grooves $k'$ $k'$, located transversely with relation to the hanger.

The top block is adjustable against the pivot-pin $l$ to take up the wear by means of screws M M, provided in the upper end of the hanger.

From the edge of the link toward the engine-shaft and between the ends of said link and the link-saddle project two lugs, N N. These lugs are provided with horizontally-elongated recesses $n$ $n$ transversely therethrough, within which are disposed sectional bearing-blocks O O, similar to the bearing-block K. The blocks O are designed to receive the pivot pins or bolts $q$ $q$, to connect the link with the adjacent ends of the eccentric-rods Q Q, and are each composed of two sections, $o$ $o$, having their opposing faces provided with oppositely-disposed approximately-semicircular grooves $o'$ $o'$. The outer block of each lug is adjusted against its pin or bolt $q$ by a screw, R, provided through its end, said screw being retained against movement by a nut, $R'$, disposed thereon.

The operation and advantages of our invention will be readily understood by those skilled in the art to which it appertains. It is a well-known fact that the power and smooth working of an engine depend greatly upon the link and its connections, and when means for the proper adjustment of these parts are lacking they become worn and loose, and being connected with the valve-rod more steam is admitted to one end of the cylinder than the other, resulting in greater loss of power.

The present invention is designed to provide a suitable construction embodying means for readily and quickly adjusting the link and the several bearings connected therewith without the necessity of detaching any of the parts of the mechanism.

We do not wish to limit ourselves to the exact construction herein shown and described, but reserve to ourselves the right to all such modifications as properly fall within the spirit and scope of our invention. For instance, the construction of the link proper and the rods connected therewith may be varied to adapt them for application to all classes of engines employing this character of reverse mechanism.

We claim as our invention—

1. The combination, with a reverse-link for steam-engines, of an adjustable facing therefor, bolts projecting outwardly from the facing, and screws projecting through the adjacent side of the link, said bolts and screws being adapted for the adjustment of the facing, substantially as set forth.

2. The combination, with a reverse-link for steam-engines, of an adjustable facing, screws for adjusting the latter, and bolts for retaining the same against further play, whereby the facing is held rigid in adjusted position, substantially as set forth.

3. The combination, with a reverse-link for steam-engines, of an adjustable facing provided with contracted ends adapted to slide in grooves in the ends of the link and screws for adjusting said facing, substantially as set forth.

4. The combination, with a reverse-link for steam-engines, of an adjustable facing, bolts having their heads countersunk in the latter, said bolts projecting through the adjacent upright portion of the link and provided upon their ends with nuts, and adjusting-screws passing through said upright portion and bearing against the facing, substantially as set forth.

5. The combination, with a reverse-link for steam-engines, of a facing secured thereto by screws having their heads countersunk in said facing, the latter being adjustable for the insertion of packing, substantially as and for the purpose set forth.

6. In a reverse-link for steam-engines, the combination, with the hanger provided at one end with a transverse elongated recess, of a sectional bearing-block for the reception of a pivot pin or bolt for connecting the hanger with the lever-crank and screws for adjusting the outer section of the block against said pin or bolt, substantially as set forth.

7. In a reverse-link for steam-engines, the combination, with a hanger provided at one end with a transverse elongated recess, of a bearing-block comprising two sections provided upon their opposing faces with oppositely-disposed approximately-semicircular grooves, forming a bearing, and screws in the end of the hanger for adjusting the outer section of the block, substantially as set forth.

8. The combination, with a reverse-link for steam-engines and lugs projecting from one side thereof and provided with rectangular recesses, of bearing-blocks disposed in the latter and comprising two sections provided upon their opposing faces with oppositely-disposed approximately-semicircular grooves, forming bearings, screws bearing against the backs of the outer blocks and adapted to adjust the same inwardly, and jam-nuts upon the screws for locking them in adjusted position, substantially as set forth.

9. The combination, with a reverse-link for steam-engines, composed of two sections bolted together, the inwardly-projecting ends of one section being grooved upon their interior faces, of an adjustable facing provided with contracted ends adapted to slide in said grooves and screws for adjusting the facing, substantially as set forth.

10. In a reverse-link for steam-engines, the combination, with the link-saddle provided with a conical pin and the lever-crank provided with a bifurcated end, of a hanger provided at one end with a conical bearing for the reception of said pin and at the other end with an elongated recess carrying a sectional adjustable bearing-block embraced by the bifurcated end of the lever-crank, and a bolt passing through the latter and said block, substantially as set forth.

11. The combination, with a reverse-link for steam-engines, of a sliding block provided with a shoulder upon one side and with a conical bearing through the same and the shoulder, and a corresponding pin adapted to be seated in said bearing and connecting the link-block with the valve-rod, substantially as set forth.

12. In a reverse-link for steam-engines, and with the link-saddle provided with a conical pin having a reduced screw-threaded outer end, a hanger provided with a bearing corresponding to and embracing said pin and retained thereon by a binding-nut and a securing-nut, substantially as shown and described.

13. In a reverse-link for steam-engines, the combination, with the link-block provided with a conical bearing, of a corresponding pin seated therein and provided with perforations in its larger end for adjusting it and a reduced outer screw-threaded end, said pin being screwed through a screw-threaded perforation in the valve-rod, and a nut applied upon the projecting end, substantially as set forth.

In testimony whereof we affix our signatures in presence of two witnesses.

JNO. R. SNYDER.
JAMES DEETS.

Witnesses:
GEO. W. JOHNSON,
JAY HARRIS.